(12) United States Patent
Shimizu et al.

(10) Patent No.: US 7,763,363 B2
(45) Date of Patent: Jul. 27, 2010

(54) BEARING FOR MOTORIZED FUEL PUMP

(75) Inventors: Teruo Shimizu, Tokyo (JP); Tsuneo Maruyama, Niigata (JP); Hideki Narisako, Kariya (JP); Tadashi Hazama, Chita-gun (JP)

(73) Assignees: Denso Corporation, Aichi-ken (JP); Diamet Corporation, Niigata-Ken (JP)

( * ) Notice: Subject to any disclaimer, the term of this patent is extended or adjusted under 35 U.S.C. 154(b) by 367 days.

(21) Appl. No.: 11/814,100

(22) PCT Filed: Jan. 17, 2006

(86) PCT No.: PCT/JP2006/300521

§ 371 (c)(1),
(2), (4) Date: Jul. 17, 2007

(87) PCT Pub. No.: WO2006/077826

PCT Pub. Date: Jul. 27, 2006

(65) Prior Publication Data

US 2009/0011268 A1   Jan. 8, 2009

(30) Foreign Application Priority Data

Jan. 18, 2005 (JP) ............................. 2005-009989

(51) Int. Cl.
*B32B 15/01* (2006.01)
*B32B 15/04* (2006.01)
*B32B 15/20* (2006.01)

(52) U.S. Cl. .................. 428/647; 428/674; 428/646
(58) Field of Classification Search ................ 428/674, 428/545, 548, 551, 621, 675, 646, 647, 648
See application file for complete search history.

(56) References Cited

U.S. PATENT DOCUMENTS

2003/0143096 A1*  7/2003  Shimizu et al. ................ 419/9

FOREIGN PATENT DOCUMENTS

| JP | 53-112209 | | 9/1978 |
| JP | 54-26206 | | 2/1979 |
| JP | 55-119144 | | 9/1980 |
| JP | 55-145107 | A | 11/1980 |
| JP | 2004-143580 | A | 5/2004 |
| JP | 2004-324712 | A | 11/2004 |

* cited by examiner

*Primary Examiner*—Michael Lavilla
(74) *Attorney, Agent, or Firm*—Leason Ellis LLP.

(57) ABSTRACT

A bearing for a motorized fuel pump is made of a Cu—Ni based sintered alloy, composed of: 21 to 35% by mass of Ni, 5 to 12% by mass of Sn, 3 to 7% by mass of C, 0.1 to 0.8% by mass of P, and the balance of Cu and inevitable impurities. A matrix of the bearing is formed with pores with a porosity of 8 to 18%, and the P component is predominantly included at the grain boundary, and free graphite is distributed along the insides of open pores that are open to the surface and extending into the bearing. In this bearing, a Sn rich alloy layer containing equal to or more than 50% by mass of Sn is formed on the insides of the open pores and near openings of the open pores.

2 Claims, 2 Drawing Sheets

BEARING FOR MOTORIZED FUEL PUMP

CROSS REFERENCE TO RELATED APPLICATIONS

This is a U.S. national phase application under 35 U.S.C. §371 of International Patent Application No. PCT/JP2005/300521 filed Jan. 17, 2006, and claims the benefit of Japanese Application No. 2005-009989, filed Jan. 18, 2005. The International Application was published in Japanese on Jul. 27, 2006 as International Publication No. WO 2006/077826 under PCT Article 21(2) the content of which are incorporated herein in their entirety.

TECHNICAL FIELD

The present invention relates to a bearing for a motorized fuel pump, made of a Cu—Ni based sintered alloy.

Conventionally, an engine that uses a liquid fuel such as gasoline or light oil is typically equipped with a motorized fuel pump. For example, FIG. 2 shows an outline cross-sectional side view of a known motorized fuel pump 20 for use with a gasoline engine.

In the motorized fuel pump 20 shown in FIG. 2, a rotating shaft 23 fixed to both ends of a motor 22 is supported by bearings 24 in a casing 21, and an impeller 25 is inserted onto one end of the rotating shaft 23. A narrow gasoline flow passage 26 is formed along the outer peripheral surface of the impeller 25, the outer peripheral surface of the motor (armature) 22, and the space between the bearings 24 and the rotating shaft 23. In addition, a fuel passage (not shown) is formed in the casing 21. When the motor 22 rotates and causes the impeller 25 to rotate, gasoline (fuel) 27 is drawn into the casing 21 under pressure, and then fed out from the casing 21 via the gasoline flow passage 26 and the fuel passage into a separate gasoline engine.

In such a motorized fuel pump 20, various high strength Cu-based sintered alloys are used as the bearings 24 (see, for example).

Japanese Unexamined Patent Application, First Publication No. S54-26206,

Japanese Unexamined Patent Application, First Publication No. S55-119144, and Japan Examined Patent Application, Second Publication No. S57-16175

SUMMARY OF THE INVENTION

In recent years, engines having motorized fuel pumps which use liquid fuels such as gasoline or light oil have been widely used all over the world. However, the quality of the liquid fuel used differs in different parts of the world, and many regions use low quality gasoline. One type of gasoline known as low quality contains organic acids. When a low quality gasoline containing organic acids is used, the organic acids cause the bearings 24 of the motorized fuel pump 20, made of Cu-based sintered alloy to corrode. Such corrosion of the bearings 24 exists near the openings of pores that are open to the surface of the bearing 24 and extending into the inside of the bearing 24 (referred to hereunder as open pores) and on the inside of such open pores, thus weakening the bearing 24, and reducing the service life of the bearing 24.

In addition, in recent years, there has been a marked progression towards smaller and lighter engines for vehicles and the like, and consequently there is a strong requirement for smaller and lighter fuel pumps for use with these engines, which means that the bearings which are one component of such a motor, must be smaller and thinner-walled. However, with the motorized fuel pump 20 of the construction described above, in order to reduce the size of the pump without losing discharge performance, a high rotation speed is required. In such a case, when the size of the motorized fuel pump 20 is reduced, the liquid fuel 27 drawn into the motorized fuel pump 20 passes through the gasoline flow passage 26, which is significantly smaller because of the reduced size, at high speed and under high pressure. Under such conditions, the bearing 24 in particular requires even higher strength and abrasion resistance due to its smaller scale and thinner-walled construction. However, at present, although conventional bearings made of Cu-based sintered alloys all have high strength, they do not have sufficient abrasion resistance, and the bearing wears down quickly, reaching the end of its useful life after only a short period of time.

Therefore, the inventors of the present invention conducted research into developing a motorized pump bearing which has excellent corrosion resistance to gasoline containing organic acids, while maintaining excellent strength and abrasion resistance. The results of this research are shown below.

(i) Base powders Cu—Ni alloy powder, Cu—P alloy powder, Sn powder and graphite powder were combined and mixed to produce a mixed powder with the following composition: 21 to 35% by mass of Ni, 5 to 12% by mass of Sn, 3 to 7% by mass of C, 0.1 to 0.8% by mass of P, the balance of Cu, and inevitable impurities (percentages are by mass). A green compact obtained by pressing this mixed powder was sintered at a temperature from 800 to 950° C. The sintered body obtained by the sintering process was cooled rapidly at a cooling rate of not less than 15° C. per minute, thereby obtaining a bearing made of a Cu—Ni based sintered alloy where pores are distributed throughout a matrix at a porosity of 8 to 18%, the P component is predominantly included at the grain boundary, and free graphite is distributed along the insides of the pores, as shown in the schematic drawing of the cross sectional structure in FIG. 1. A Sn rich alloy layer containing more than 50% by mass of Sn was formed on the insides of open pores of the bearing and near openings of the open pores.

The porosity is expressed as a percentage obtained by subtracting the sintered density from the theoretical density of a substance with the same composition as the sintered body, and dividing the product by the theoretical density. The porosity p is expressed as follows, where p is the porosity, D is the density of the sintered body, and Dr is the theoretical density of a substance with the same composition as the sintered body.

$p=(Dr-D)/Dr \times 100$ (ii) In a bearing in which the Sn rich alloy layer is formed, the bond strength between Cu—Ni alloy grains is remarkably high due to the effect of the P component which is present between the Cu—Ni alloy grains during sintering and improves the sintering property between the alloy grains. Consequently the bearing itself has high strength. In the bearing made of a Cu—Ni based sintered alloy, the Sn rich alloy layer containing at least 50% by mass of Sn is formed on the inside of the open pores and near the openings of the open pores. Consequently, corrosion of the areas which are most susceptible to corrosion by impurities such as organic acids included in the liquid fuel, such as the inside of the open pores and areas near the openings of the open pores, can be prevented. Such a bearing made of a Cu—Ni based sintered alloy including a Sn rich alloy layer shows excellent corrosion resistance to liquid fuel containing large amounts of organic acids.

(iii) In the Sn rich alloy layer, the Sn concentration is highest at the topmost surface layer, and the Sn content decreases with increasing proximity to the Cu—Ni alloy grains. Furthermore, the Sn rich alloy layer is composed of a Sn—Cu—Ni-based Sn base alloy containing on average 5 to 27% by mass of Cu, 5 to 22% by mass of Ni, and 0.1 to 0.6% by mass of P, the balance of Sn, and inevitable impurities.

The present invention is a corrosion resistant and abrasion resistant bearing for a motorized fuel pump, which was arrived at based on the results of such research, made of a Cu—Ni based sintered alloy, which has the composition 21 to 35% by mass of Ni, 5 to 12% by mass of Sn, 3 to 7% by mass of C, 0.1 to 0.8% by mass of P, the balance of Cu, and inevitable impurities, wherein pores are formed in the matrix at a porosity of 8 to 18%, the P component is predominantly included at the grain boundary, free graphite is distributed along the inside surfaces of the pores, and a Sn rich alloy layer containing at least 50% by mass of Sn is formed on the insides of the open pores that are open to the surface and near the openings of the open pores.

In this bearing, the Sn rich alloy layer preferably has the composition 5 to 27% by mass of Cu, 5 to 22% by mass of Ni, 0.1 to 0.6% by mass of P, the balance of Sn, and inevitable impurities.

The bearing of the present invention can demonstrates excellent corrosion resistance, abrasion resistance, and high strength when used in a motorized fuel pump for an engine that uses normal liquid fuel, but also with liquid fuels such as poor quality gasoline containing organic acids. Accordingly, an engine can be provided which can maintain sufficiently high performance over long periods even when poor quality liquid fuel is used.

DETAILED DESCRIPTION OF THE INVENTION

Figure 1:
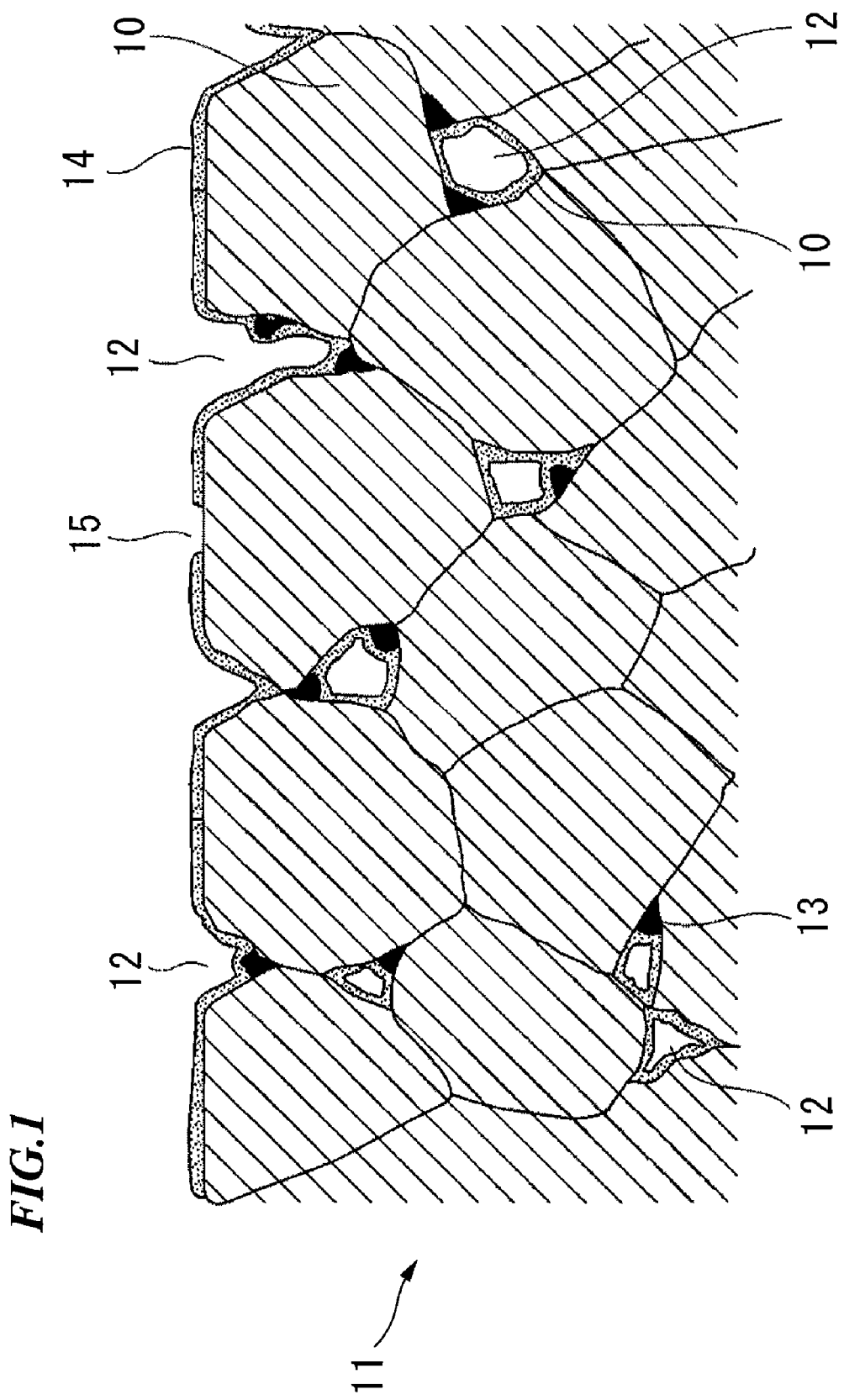
FIG. 1 is a schematic view showing a structure of a cross-section at near the surface of a bearing according to the present invention, observed through an optical microscope.
Figure 2:
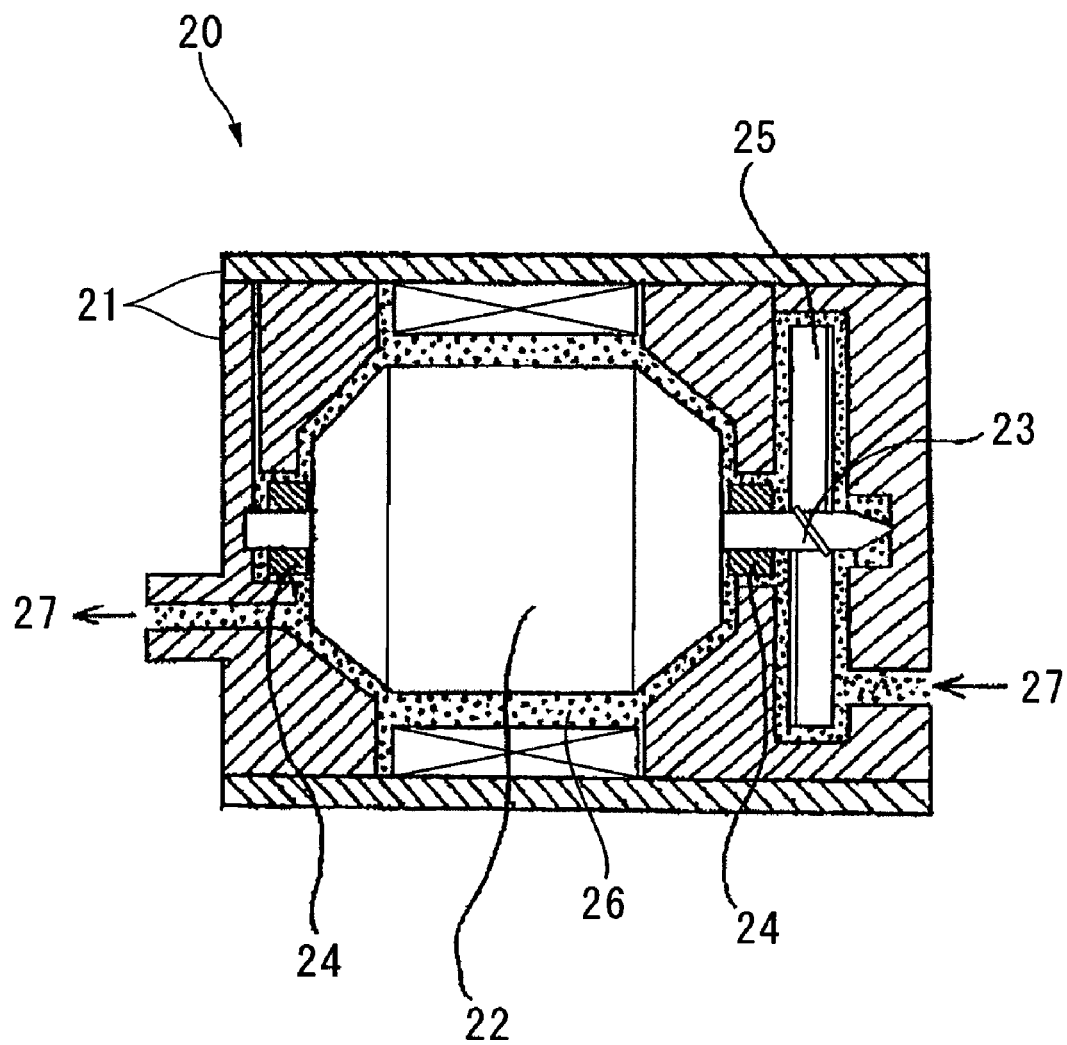
FIG. 2 is an outline cross-sectional side view showing a motorized fuel pump for a gasoline engine.

As follows is a description of the bearing of the present invention, with reference to FIG. 1. FIG. 1 is a schematic drawing of the cross-sectional structure of a bearing surface part of a surface cut by a plane passing through the central axis of the bearing, observed through an optical microscope. In this bearing, open pores 12 are distributed throughout a matrix 11 of Cu—Ni alloy grains 10 of the bearing at a porosity of 8 to 18%. In addition, a P component is distributed at the grain boundary of the Cu—Ni alloy grains 10, and free graphite 13 is distributed along the insides of the open pores 12, respectively. When the bearing is made of such a Cu—Ni based sintered alloy, excellent abrasion resistance is ensured by the Cu—Ni alloy grains 10 that make up the matrix 11. In addition, owing to the effect of the highly lubricious free graphite 13 distributed on the insides of the open pores 12, and the effect of a fluid lubricant film formed by the liquid fuel supplied from the bearing outer peripheral surface to the bearing inner peripheral surface through the open pores 12 within the bearing, the frictional resistance applied to the bearing during the high speed rotation of the motor producing high pressure and high speed flow of the liquid fuel is reduced, and the abrasion resistance is further improved. Moreover, because the bond strength between the Cu—Ni alloy grains 10 is remarkably high due to the effect of the P component present between the Cu—Ni alloy grains 10, which during sintering improves the sintering property between the grains, the bearing itself has high strength. Accordingly, a bearing formed from the Cu—Ni based sintered alloy may be smaller and thinner-walled while exhibiting excellent abrasion resistance in environments exposed to fast-flowing high-pressure liquid fuel.

A Sn rich alloy layer 14 containing at least 50% by mass of Sn is formed on the inside surfaces of the open pores 12 and near the openings (surface of the bearing) of the open pores 12. The Sn rich alloy layer 14 covers the majority of the bearing surface, but as shown in FIG. 1, exposed portions 15 which are not covered by the Sn rich alloy layer 14 and where the matrix of Cu—Ni alloy grains 10 is exposed, may appear in areas where there is a wide interval between the open pores 12. However, even if a small number of exposed portions are formed, because they are not located near the openings which are susceptible to corrosion, the exposed portions have very little effect on organic acid corrosion.

Next, the reason why the composition and the porosity of the Cu—Ni based sintered alloy were limited as described above in the motorized fuel pump bearing of the present invention will be described.

(1) Composition
  (a) Ni
  The Ni component contributes excellent strength, abrasion resistance and corrosion resistance, and has an effect of providing the bearing with excellent strength, abrasion resistance and corrosion resistance by forming the sintered matrix 11 from Cu—Ni alloy grains 10. When the Ni content of the Cu—Ni alloy is less than 21%, excellent strength, abrasion resistance and corrosion resistance of the bearing cannot be ensured, and when the Ni content exceeds 35%, the sintering property decreases markedly, and strength degradation is inevitable. Accordingly, the Ni content is set within a range from 21 to 35%.
  (b) P
  The P component has the effect of improving the sintering property between the Cu—Ni alloy grains 10 during the sintering process, and improving the strength of the matrix 11 composed of the Cu—Ni alloy grains 10, that is to say, improving the strength of the bearing. When the P content is less than 0.1% a sufficient sintering property is not exhibited, and when the P content exceeds 0.8%, the strength at the boundary of the Cu—Ni alloy grains 10 decreases markedly. Accordingly, the P content is set within a range from 0.1 to 0.8%.
  (c) Graphite
  The graphite component exists primarily in the form of free graphite along the inside of the open pores 12 distributed throughout the matrix 11, and has the effect of providing the bearing with excellent lubricity, and contributing to an improvement in the abrasion resistance of the bearing. When the graphite content is less than 3%, the desired effect of improving the abrasion resistance is not obtained, and when the graphite content exceeds 7% the strength decreases markedly. Accordingly, the graphite content is set within a range from 3 to 7%.
  (d) Sn
  The Sn component is added to improve the corrosion resistance of the bearing by forming the Sn rich alloy layer 14 containing at least 50% by mass of Sn on the inside surfaces of the open pores 12 and near the openings of the open pores 12. A Sn content of less than 5% is not preferable since the Sn rich alloy layer 14 is not formed with sufficient thickness, and a Sn content exceeding 12% is not preferable since the Sn rich alloy layer 14 is formed at the grain boundary of the Cu—Ni alloy grains, which reduces the strength markedly. Accordingly, the Sn content is set within a range from 5 to 12%.

(2) Porosity
  The open pores 12 distributed throughout the bearing matrix 11 have the effect of reducing the strong friction and high surface pressure applied to the bearing by the high-pressure and high-speed flow of the liquid fuel described above, and markedly suppressing abrasion of the bearing.

When the porosity is less than 8%, the proportion of open pores 12 distributed throughout the matrix 11 is too small and the effect cannot be exhibited adequately, and when the porosity exceeds 18%, the strength of the bearing reduces markedly. Accordingly, the porosity is set within a range from 8 to 18%.

(3) Composition of the Sn Rich Alloy Layer 14

The Sn rich alloy layer 14 is obtained by rapid cooling the sintered bearing obtained by sintering, at a cooling rate of 15° C. per minute. The Sn concentration of the Sn rich alloy layer 14 is highest at the topmost surface layer, and the Sn content decreases with increasing proximity to the alloy grains 10. The average composition of the Sn rich alloy layer 14 is 5 to 27% by mass of Cu, 5 to 22% by mass of Ni, and 0.1 to 0.6% by mass of P, with the balance of Sn and inevitable impurities.

TEST EXAMPLES

The motorized fuel pump bearing of the present invention is described in concrete terms by way of examples.

As the base powders, Cu—Ni alloy (with the Ni content shown in Table 1) powders, Cu—P alloy (with the P content shown in Table 1) powders, graphite powders, Sn powders, and a Cu powder, each having a mean grain size from 30 to 100 μm, were prepared. These base powders were combined to obtain each composition listed in Table 1 and Table 2, 1% stearic acid was added, and the resulting products were mixed for 20 minutes in a V-type mixer and then pressed into green compacts under a predetermined pressure within a range from 200 to 700 MPa. The resulting green compacts were sintered in an ammonia decomposition gas atmosphere at the temperatures shown in Table 1. Finally, the resulting sintered bodies were subjected to sizing under a predetermined pressure within a range from 200 to 700 MPa, thereby producing bearings of the present invention 1 through 12, comparative bearing 1, and conventional bearing 1, each made of a Cu—Ni based sintered alloy or Cu-based sintered alloy having the porosity shown in Table 2. Each bearing had an outside diameter of 9 mm, an inside diameter of 5 mm, and a height of 6 mm.

An arbitrary cross-section of the bearings of the present invention 1 through 12, the comparative bearing 1, and the conventional bearing 1 was examined using an optical microscope (200× magnification). In each of the bearings of the present invention 1 through 12, the pores were distributed throughout the Cu—Ni alloy bearing matrix 11 in the proportion shown in the porosity in Table 2, a P component was distributed at the grain boundary of the Cu—Ni alloy grains 10, free graphite 13 was distributed along the inside surfaces of the open pores 12, and the Sn rich alloy layer 14 containing at least 50% by mass of Sn was formed on the insides of the open pores 12 which are open to the surface of the bearing and near the openings of the open pores 12. On the other hand, in the comparative bearing 1, pores were distributed throughout the Cu—Ni alloy bearing matrix in the proportion shown in the porosity in Table 2, a P component was distributed at the grain boundary of the Cu—Ni alloy grains, and free graphite was distributed along the inside surfaces of the open pores, but no Sn rich alloy layer was formed. In the conventional bearing 1, pores were distributed throughout the Cu-based alloy bearing matrix in the proportion shown in the porosity in Table 2, and free graphite was distributed along the inside surfaces of the open pores.

Next, the following tests were performed using the bearings of the present invention 1 through 12, the comparative bearing 1, and the conventional bearing 1.

The bearings of the present invention 1 through 12, the comparative bearing 1, and the conventional bearing 1 were incorporated into fuel pumps having outside dimensions of 110 mm in length and 40 mm in diameter. Each fuel pump was then placed inside a gasoline tank and tested under the following conditions.

Rotation speed of impeller: 5000 (minimum rotation speed) to 15000 (maximum rotation speed) rpm Gasoline flow rate: 50 liters/hour (minimum flow rate) to 250 liters/hour (maximum flow rate)

Pressure applied to bearing by high speed rotating shaft: maximum 500 kPa

Test time: 500 hours

That is to say, a practical test was performed in which high speed rotation of the motor causes gasoline to flow at high speed through a narrow gap, producing conditions in which the bearing was subjected to high pressure and exposed to gasoline flowing at a high flow rate, and the maximum wear depth of the bearing surface after the test was measured. The results are shown in Table 2.

In addition, in order to evaluate the strength of the bearings of the present invention 1 through 12, the comparative bearing 1, and the conventional bearing 1, each bearing was subjected to a crush test, and the crushing strength was measured. The results are shown in Table 2.

Furthermore, in order to evaluate the corrosion resistance of the bearings of the present invention 1 through 12, the comparative bearing 1, and the conventional bearing 1, an organic acid test solution which emulates poor quality gasoline was prepared by the addition of a carboxylic acid represented by the formula RCOOH (where R is a hydrogen atom or hydrocarbon group), and heated to 60° C., and the bearings of the present invention 1 through 12, the comparative bearing 1, and the conventional bearing 1 were soaked in the heated organic acid test solution for 100 hours. The amount of variation in the mass of each bearing before and after soaking in the organic acid test solution was measured, and the results are shown in Table 2.

TABLE 1

| Bearing | | Base powder composition (mass %) | | | | | Sintering temperature (° C.) | Cooling rate of sintered body (° C./minute) |
| --- | --- | --- | --- | --- | --- | --- | --- | --- |
| | | Graphite powder | Cu-P powder | Sn powder | Cu-Ni powder | Cu powder | | |
| Present invention | 1 | 5.0 | Cu-6% P: 5.0 | 5.8 | Cu-25% Ni: 84.2 | — | 950 | 20 |
| | 2 | 6.7 | Cu-6% P: 5.0 | 6.1 | Cu-27% Ni: 82.2 | — | 900 | 35 |
| | 3 | 4.9 | Cu-6% P: 5.0 | 9.1 | Cu-27% Ni: 81.1 | — | 920 | 40 |
| | 4 | 5.2 | Cu-6% P: 5.0 | 11.1 | Cu-28% Ni: 78.7 | — | 950 | 50 |
| | 5 | 4.8 | Cu-5% P: | 8.9 | Cu-37% Ni: 76.3 | — | 920 | 35 |
| | 6 | 5.0 | Cu-5% P: | 9.0 | Cu-38% Ni: 76.0 | — | 910 | 20 |
| | 7 | 4.9 | Cu-5% P: | 9.3 | Cu-37% Ni: 75.8 | — | 890 | 15 |

TABLE 1-continued

| | Base powder composition (mass %) | | | | | Sintering temperature (° C.) | Cooling rate of sintered body (° C./minute) |
|---|---|---|---|---|---|---|---|
| Bearing | Graphite powder | Cu-P powder | Sn powder | Cu-Ni powder | Cu powder | | |
| 8 | 3.5 | Cu-6% P: 5.0 | 5.3 | Cu-35% Ni: 86.2 | — | 970 | 45 |
| 9 | 4.7 | Cu-5% P: | 6.6 | Cu-44% Ni: 78.7 | — | 970 | 50 |
| 10 | 6.5 | Cu-7% P: | 9.5 | Cu-45% Ni: 74.0 | — | 900 | 50 |
| 11 | 3.2 | Cu-7% P: | 10.7 | Cu-44% Ni: 76.1 | — | 970 | 60 |
| 12 | 6.8 | Cu-7% P: | 11.9 | Cu-48% Ni: 71.3 | — | 890 | 40 |
| Comparative 1 | 3.0 | — | 10.0 | — | 87.0 | 770 | 10 |
| Conventional 1 | 3.0 | — | 3.0 | Cu-25% Ni: 76.0 | 18.0 | 800 | 10 |

TABLE 2

| | | Composition (mass %) | | | | Sn rich alloy layer | Porosity (%) | Crushing strength (N/mm²) | Maximum wear depth (μm) | Change in mass after corrosion test (mg) |
|---|---|---|---|---|---|---|---|---|---|---|
| Bearing | Ni | Sn | P | C | Cu | | | | | |
| Present invention | 1 | 21.1 | 5.8 | 0.3 | 5.0 | Balance | Y | 14.8 | 235 | 3.1 | 9.8 |
| | 2 | 22.2 | 6.1 | 0.3 | 6.7 | Balance | Y | 11.2 | 231 | 4.5 | 7.5 |
| | 3 | 21.9 | 9.1 | 0.3 | 4.9 | Balance | Y | 12.1 | 293 | 1.8 | 6.9 |
| | 4 | 22.0 | 11.1 | 0.3 | 5.2 | Balance | Y | 9.2 | 334 | 2.4 | 6.3 |
| | 5 | 28.2 | 8.9 | 0.5 | 4.8 | Balance | Y | 10.2 | 316 | 1.1 | 8.1 |
| | 6 | 28.9 | 9.0 | 0.5 | 5.0 | Balance | Y | 13.0 | 260 | 1.0 | 5.2 |
| | 7 | 28.0 | 9.3 | 0.5 | 4.9 | Balance | Y | 17.8 | 222 | 1.2 | 7.1 |
| | 8 | 30.2 | 5.3 | 0.3 | 3.5 | Balance | Y | 10.5 | 358 | 1.1 | 4.6 |
| | 9 | 34.6 | 6.6 | 0.5 | 4.7 | Balance | Y | 9.8 | 370 | 1.3 | 3.3 |
| | 10 | 33.3 | 9.5 | 0.7 | 6.5 | Balance | Y | 12.2 | 310 | 1.1 | 2.3 |
| | 11 | 33.5 | 10.7 | 0.7 | 3.2 | Balance | Y | 8.5 | 443 | 0.8 | 1.1 |
| | 12 | 34.2 | 11.9 | 0.7 | 6.8 | Balance | Y | 10.6 | 355 | 1.0 | 2.8 |
| Comparative 1 | | 0 | 10.0 | 0 | 3.0 | Balance | N | 13.5 | 196 | 14.0 | 150 |
| Conventional 1 | | 19.0 | 3.0 | 0 | 3.0 | Balance | N | 13.1 | 158 | 12.0 | 50.8 |

From the results in Table 1 and Table 2, all of the bearings of the present invention 1 through 12 had excellent abrasion resistance, high strength due to the effect of improving the sintering property which the P component distributed at the grain boundary of the Cu—Ni alloy grains 10 provides, and excellent corrosion resistance to the organic acid test solution. In contrast, the conventional bearing 1 made of a Cu-based sintered alloy, despite having the same high strength, suffered wear relatively quickly, and had inferior corrosion resistance to the organic acid test solution. It is also apparent that the comparative bearing 1 in which the Sn rich alloy layer is not formed has inferior corrosion resistance to the organic acid test solution.

Although preferred examples of the present invention were described above, the present invention is not limited to the above-described examples. Various additions, omissions, substitutions and other changes are possible provided that they are within a scope which does not depart from the scope of the present invention. The present invention is not limited to the description above, and is limited only by the scope of the appended claims.

The bearing of the present invention exhibits excellent corrosion resistance, abrasion resistance and high strength, when used not only in a motorized fuel pump for an engine that uses normal fuel, but even in engines that use poor quality liquid fuel such as gasoline containing organic acids or the like. Accordingly, it is possible to provide an engine which can maintain sufficiently high performance over long periods despite poor quality liquid fuel being used.

What is claimed is:

1. A bearing for a motorized fuel pump, consisting of 21 to 35% by mass of Ni, 5 to 12% by mass of Sn, 3 to 7% by mass of C, 0.1 to 0.8% by mass of P, the balance of Cu, and inevitable impurities, said bearing including:
    a sintered matrix of Cu—Ni alloy grains;
    pores formed throughout the matrix at a porosity of 8 to 18%;
    a P component predominantly included at grain boundaries of the Cu—Ni alloy grains;
    free graphite distributed along inner surfaces of open pores, which are open to a surface of said bearing and extending into an inside of the bearing; and
    a Sn rich alloy layer which contains 50% or more by mass of Sn, and is formed on inner surfaces of said open pores and peripheries of openings of said open pores.

2. The bearing for a motorized fuel pump according to claim 1, wherein said Sn rich alloy layer is composed of 5 to 27% by mass of Cu, 5 to 22% by mass of Ni, and 0.1 to 0.6% by mass of P, the balance of Sn, and inevitable impurities.

* * * * *